UNITED STATES PATENT OFFICE.

JOHN COLLINS CLANCY, OF NIAGARA FALLS, NEW YORK, ASSIGNOR TO THE NITROGEN CORPORATION, OF PROVIDENCE, RHODE ISLAND, A CORPORATION OF RHODE ISLAND.

AMMONIA SYNTHESIS.

1,352,179.  Specification of Letters Patent.  Patented Sept. 7, 1920.

No Drawing. Original application filed June 25, 1918, Serial No. 241,758. Divided and this application filed September 8, 1919. Serial No. 322,420.

*To all whom it may concern:*

Be it known that I, JOHN COLLINS CLANCY, a citizen of the United States, residing at Niagara Falls, in the county of Niagara and State of New York, have invented certain new and useful Improvements in Ammonia Synthesis, of which the following is a specification.

This invention relates to a process of synthesizing ammonia from its elements and in one of its aspects is especially concerned with certain discoveries which I have made in connection with catalytic materials by means of which such synthesis may be effected.

Much has been written, especially in patent literature, concerning the supposed efficacy of various catalysts for the synthesis of ammonia; and among these calcium cyanamid is mentioned in the French patent to Brochet and Boiteau, No. 425,952, published June 24, 1911.

Calcium cyanamid is therein described as a suitable catalyst and the specific statement is made that "the combination of hydrogen and nitrogen effects itself at atmospheric pressure, but one can equally operate with a different pressure."

I myself, long since arrived at the conclusion that such a substance as calcium cyanamid should be capable of being effectively used as a catalyst for the purpose in question; but subsequently discovered, when attempting to use it under pressures approximating that of the atmosphere or somewhat higher, that that "catalyst" was not a true catalyst, since it decomposed when heated to operating temperatures (*e. g.* 450° C.), when in the presence of a mixture of hydrogen and nitrogen,—ammonia and hydrocyanic acid being liberated.

This discovery for a time caused me to relinquish all thought of using calcium cyanamid as an ammonia synthesizing catalyst; but I subsequently made a further discovery, which was in a way most unexpected, namely, that when relatively high pressures are used in the synthesizing operation, this catalyst, especially when prepared as hereinafter described, is not destroyed,— no hydrocyanic acid being liberated.

In other words, properly prepared calcium cyanamid, when used to synthesize ammonia from a mixture of the elements of the latter, preferably in combining proportions, at a temperature which ordinarily would cause dissociation of the catalyst, but under a high pressure,—does not dissociate, but rather acts as a true catalyst and moreover a particularly effective one.

This discovery is directly at variance with the statement in the French patent aforesaid; and constitutes, I believe, a material step forward in this art.

That the mere application of pressure to the gaseous mixture being treated, whereby in turn to subject the exceedingly porous and otherwise unstable catalyst material to high pressure, should thus apparently render this cyanamid stable and enable it to act as a true catalyst, is noteworthy, and assuredly not to be expected from any disclosure in the art with which I am acquainted.

I have also discovered that calcium cyanamid is not the only substance which behaves in this peculiar fashion. Thus,—to select another cyanamid the metal base of which belongs to a totally different group of metals,—copper cyanamid, while of itself not an efficient low-temperature catalyst, nevertheless behaves in a very similar way, in that when properly prepared for use in a catalyst and subjected to ammonia synthesizing conditions, using a gaseous mixture of nitrogen and hydrogen under say 1500 pounds pressure, it is not decomposed; while on the other hand, with everything else the same as in the preceding example, except that the pressure used is but substantially that of the atmosphere,—I find that the copper cyanamid behaves just as does the calcium cyanamid under such circumstances, namely, it decomposes with liberation of hydrocyanic acid.

The same thing applies to silver cyanamid, which, also, when properly prepared and used under high pressure is available for use in a low-temperature catalyst, especially as a carrier for more active catalytic material, as hereinafter described.

Copper cyanamid is especially worthy of remark; because copper has, I believe, generally been regarded by those familiar with this art, as a catalytic "poison."

Again, barium cyanamid is another substance which is converted to a stable catalyst and prevented from decomposing during ammonia synthesis, only by subjecting it to high pressure to prevent the formation of HCN. Barium cyanamid, like calcium cyanamid, is a particularly efficient catalyst when used under, say, one hundred atmospheres pressure. Strontium cyanamid is also available for use under such conditions.

Having thus considered the effect of pressure, I will now point out certain physical characteristics which I have discovered are practically essential to any really available catalyst for the synthetic reaction in question.

As is well known, the function of a catalyst of the kind in question is to promote or expedite a reaction which, if given sufficient time, would continue to take place in any event, if not otherwise interrupted, until equilibrium under the prescribed conditions had been established; and, loosely speaking, there are an enormous number of substances which can perform the function, to some measure, of speeding up the combination of mixed nitrogen and hydrogen, to form ammonia.

The measure of the efficiency of such "catalysts" is however in nearly every instance very small indeed, and in most cases is negligible; certainly from any practical or commercial standpoint.

Further, and aside from the chemical composition of the substance selected, I have found that the physical condition of the contact body used, is next in importance to chemical composition, for the purpose in question. Thus calcium cyanamid as prepared commercially is, even when used under high pressure, by no means comparable as catalytic material to this substance as prepared according to the methods hereinafter described.

Properly speaking, then, commercial calcium cyanamid, in the absence of some preparatory treatment to open it up, so to speak, and render it porous, is not specially good catalytic material for commercial ammonia synthesis; because it is not in physical condition to adapt it for use for that purpose. It is too dense and hard and offers for a given weight thereof, but comparatively little surface in contact with which the synthesis can be effected; and to render this and like substances available for use, they must be produced or treated in a manner to impart to them physical characteristics quite different from the familiar ones thereof.

My new catalytic materials may conveniently be prepared in various ways, but in any case are preferably formed at relatively low temperatures; e. g. a black heat, and, desirably, very much lower, indeed, than this.

For example, I may prepare a solution of commercial calcium cyanamid in water and purify it with nitrate of silver, to eliminate the sulfur. The solution filtered off from the silver sulfid, is one of pure $CaCN_2$. This solution is now treated with carbon dioxid gas and, after the calcium carbonate formed has been separated by filtration, the filtrate is evaporated to dryness under vacuum, to yield crystals of cyanamid ($H_2CN_2$).

These crystals, I have discovered, are soluble in liquid ammonia, and to such a solution I add pure metallic calcium, which also is soluble in liquid ammonia; the calcium being added in molecular proportions, to form $CaCN_2$. Obviously, this reaction is preferably effected at a temperature of zero degrees centigrade, or lower, and the resultant precipitate is a pure white calcium cyanamid, much like sugar in appearance, except that it is exceedingly flocculent and porous.

It may be readily separated from the liquid ammonia by filtration and any of the solvent remaining therein may, of course, readily be driven off as vapor at a low temperature.

The so produced calcium cyanamid is white and exceedingly porous and open, whereas commercial cyanamid, usually produced in an electric furnace and at high temperatures, is black and dense; a sintered product, unsuitable for use as a catalyst. Moreover, when calcium cyanamid is dissolved in water and evaporated, it dissociates into dicyandiamid and urea. Commercial calcium cyanamid hence cannot well be purified in this manner, and while it is probable that it could be produced relatively quite pure, in the electric furnace, it would be quite too dense for the purpose intended.

Barium cyanamid, the second alkaline earth metal cyanamid, mentioned by way of illustration in the foregoing, may be produced in form to behave as an active catalyst, as follows:

Barium cyanid is prepared in pure condition and is treated in a closed receptacle with nitrogen or ammonia vapor, while heated to a temperature preferably less than black heat; say 350°–400° C. or slightly lower. Barium cyanamid, $BaCN_2$, is formed brown or black in color and peculiarly expanded and porous in character. The color is apparently due to free carbon in the product. At about 350° C. the mass turns light brown; at about 375° C, it becomes dark brown; and as 400° C. is approached, it turns black. It also tends to darken at the lower temperatures noted, as the period of treatment is prolonged.

Lumps of this material, which are quite self sustaining in character, may be used under pressure (to prevent decomposition with formation of HCN, as noted), as efficient catalysts for ammonia synthesis. Expanded and highly porous strontium cyanamid may be similarly prepared.

In preparing copper or silver cyanamid, for example, the procedure may be as follows:

I first prepare a solution of pure calcium cyanamid in water and to this add a solution of copper chlorid in water, to form a jet black precipitate of copper cyanamid (cupric salt). After filtering, the precipitate is washed free from chlorids and is then dried at from 200°–300° C.; care being taken not to heat much above 300° C. on account of the likelihood of explosion.

In fact, it is preferable to heat piecemeal, that is to say not in mass, as the mass if of considerable size is apt to explode violently. This heating operation may be conducted in an atmosphere of ammonia vapor, or nitrogen and hydrogen, or nitrogen, or in any inert gas; and the small portions being dried will usually pop or sputter as the gas generated in them expands and swells them out to form a highly expanded, porous substance, which is then ready for use as a catalyst.

Another mode of preparing the copper cyanamid catalytic material is to convert calcium cyanamid into ammonium cyanamid according to the equations:

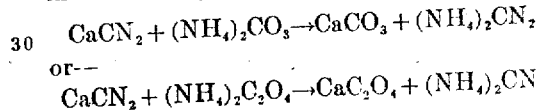

$$CaCN_2 + (NH_4)_2CO_3 \rightarrow CaCO_3 + (NH_4)_2CN_2$$

or—

$$CaCN_2 + (NH_4)_2C_2O_4 \rightarrow CaC_2O_4 + (NH_4)_2CN_2$$

In using either ammonium carbonate or oxalate, as per these equations, it will be understood that such materials, as also the calcium cyanamid, are preferably chemically pure. The insoluble calcium carbonate or oxalate formed is filtered off and to the filtrate I add a solution of copper chlorid, to form a jet black precipitate of $CuCN_2$. This is separated from the liquid by filtering and is washed to free it from chlorids. It is then dried and treated as before to form the highly expanded material.

The porous lumps of pure copper cyanamid thus formed may be converted to copper nitrid by treatment with nitrogen mixed with hydrogen, at 500° C. or somewhat higher, under atmospheric pressure; HCN being given off copiously.

The copper nitrid product is black and in the form of very porous particles, and this substance is also available for use as a catalyst, although not so highly efficient as the similarly constituted substances mentioned which in general may be more properly characterized as derivatives of cyanamid.

The preparation of silver compounds corresponding to the above copper compounds may readily and similarly be effected by substituting a suitable silver salt, such as the nitrate, for the corresponding copper salt.

It is also possible to combine the above mentioned materials to advantage in certain ways. Thus, if after the masses or lumps of, for example, expanded copper cyanamid have been prepared, they are then treated with a solution of metallic calcium, or the like, in liquid ammonia and the latter is vaporized off,—there will have been formed an expanded mass of copper cyanamid, impregnated throughout its multitudinous pores with metallic calcium. All of the foregoing operations are carried out in closed receptacles and in such fashion as to avoid contamination by oxygen from the air or from other sources.

The so formed impregnated copper cyanamid is then heated to, say, 250°–300° C. in an autoclave or elsewhere, with, however, no oxygen present,—to form calcium cyanamid in particularly active catalytic condition, directly in the pores of the expanded copper cyanamid lumps, which now will also contain metallic copper. This metal is present, in effect, in ramified form and acts as a conductor of heat during the subsequent exothermic, ammonia-forming reaction.

Silver may, of course, be substituted for copper in the above, as already observed.

I desire not to be limited to the above recited modes of preparing materials in condition for use as effective catalysts for ammonia synthesis; those herein described being given merely by way of example. Thus, by way of further illustration:

Starting with a solution of pure metallic calcium in liquid ammonia, I bubble hydrocyanic acid gas through said solution to form calcium cyanid, $Ca(CN)_2$, which is precipitated as a flocculent white powder, the particles or crystals of which are finer than those of the analogously produced calcium cyanamid.

This precipitate is readily separated from the liquid ammonia by filtration and responds to all of the tests for a cyanid and not to those for a cyanamid. This substance, so far as I am aware, has never before my discovery of this mode of preparing it at a very low temperature, been produced in solid but porous or flocculent form. Never, before, however, has it been produced by means of such a menstruum as liquid ammonia, which possibly accounts for this.

This novel material is particularly available for use in the formation of a catalyst for the synthesis of ammonia from its elements, when operating under pressure, as noted.

When placed in the catalytic chamber of a suitably constructed apparatus and subjected to a mixture of pure hydrogen and nitrogen, in combining proportions and under pressure, this material or rather a modification thereof,—since the catalyzing substance turns black under these conditions, before 200° C. is reached,—efficiently synthesizes ammonia at temperatures as remarkably low as 300°–350° C.

Indeed, this catalyst even produces ammonia at the temperatures noted, at a pressure as low as that of the atmosphere, although gradual decomposition also takes place for a while, under such a low pressure,—HCN being very slowly given off for a number of hours.

Peculiarly, however, this slow decomposition appears to substantially cease after a time.

Here then is a catalyst of the character in question which requires but a comparatively low pressure, e. g. twenty-five atmospheres or lower to stabilize it practically from the beginning of its use under operative conditions and it is produced at around 200° C., so that it permits of its employment as an effective catalyst at a temperature of from 300°–350° C., and, if desired, under quite reasonable pressures. This catalyst, by the way, although derived from a cyanid, responds to the characteristic tests for a cyanamid, after its production in manner aforesaid.

The factors which I believe are of importance in catalysts for the purpose in question, if they are to be really effective, may now be briefly enumerated.

1. They preferably comprise carbon directly united to nitrogen by a plurality of bonds; although in some instances, as noted, one of these elements may be absent,—at least initially.

2. They should preferably be open or porous in structure, whether supported on a carrier or in the form of lumps, or the like.

3. They should be produced at a low temperature, preferably in no case above a black heat and desirably much lower.

4. They should be of such a nature that they tend to dissociate to some extent at least, in the presence of the gases being treated, and at the temperature at which they are used, if not subjected to sufficient pressure to overcome said tendency and render them stable while yet leaving them extremely active catalytically.

The tendency to dissociate (and its prevention) in the observed manner, appears to be of great importance and its value in a catalyst for ammonia synthesis has apparently never been noted by any of the numerous investigators in this art. By virtue of this tendency the catalytic material is so active that its constituents are able to evanescently combine with one or both of the gases being treated, probably to afford the continuous delivery in the pores of the catalyst of said gas or gases in nascent condition or possibly in actual combination as ammonia.

Further, so far as I am aware, no one seems to have realized that such substances which thus tend to dissociate at insufficiently high pressures when under the remaining requisite conditions, can be rendered just sufficiently stable for the intended purpose by subjecting them to a higher pressure. As to the pressure required, that of course will depend upon the catalytic material used, as above indicated. It will also depend upon the temperature of the operation; and normally the lower the temperature at which the synthesis can be effected, the better, for several reasons.

In the first place it is well recognized that the higher the temperature, the less the ammonia content that can exist in a mixture of nitrogen, hydrogen and ammonia, assuming equilibrium to have been established. Conversely, then, with a really efficient catalyst for low temperature synthesis, the possible yield of ammonia increases as the temperature is lowered toward, say 250°–300° C.

Secondly, the employment of such low temperatures obviates substantially all of the tremendous difficulties attendant upon the use of high pressures with suitable and not prohibitively costly apparatus, at temperatures which range around 450° C. or more.

In this disclosure it is my desire to point out those factors concerning catalysts for ammonia synthesis which appear to have been overlooked, and in this connection I may state that while, thus far, I have considered, by way of example, only substances having a metallic base, e. g. $CaCN_2$,—it is by no means essential that the catalyst be of this nature.

Thus, I may heat dry silver cyanid, AgCN, in, for example, an atmosphere of nitrogen at 200–300° C., to produce paracyanogen, $(CN)_x$. Some of the cyanogen is driven off, especially if the operation be conducted at atmospheric pressure, but the greater portion of the cyanogen polymerizes to paracyanogen, a blackish-brown product. Pressure favors the production of this material. When substantially all of the cyanogen which will not readily polymerize has been driven off, the material, which is normally in the form of an expanded porous mass, is then available for use as a catalyst for the usual mixture of nitrogen and hydrogen, preferably in combining proportions. The synthesis may be conducted at a low temperature, such as is hereinbefore referred to, and is preferably effected under pressure to with certainty prevent further decomposition of the catalyst, which of course is to be avoided with this or any other hydrocyanic-acid yielding substance.

The silver, left in somewhat connected formation in the catalytic mass, seems to be principally of value as a heat conducting medium to aid in equalizing the temperature of the catalyst throughout, when in use. The ammonia forming reaction is of course exothermic but proper control of the temperature of the incoming gas mixture in conjunction with the heat conductive metal in and about the catalyst, affords means to prevent impairment of the process by possible undue rise in temperature in the interior parts of the catalytic mass or masses when the latter are relatively large.

It is, of course, by no means essential that the paracyanogen be produced as above described. Also, since it is soluble in concentrated sulfuric acid in the cold, it may by this means be introduced into the pores of a suitable support, e. g. pumice,—to be precipitated upon the walls of said pores by dilution with water. As the precipitate is insoluble in water, it may then be thoroughly washed free from the acid and dried, preparatory to use in manner aforesaid.

I am also aware of a number of other similar catalytic substances in which the metals are conspicuous by their absence, this important line of catalysts being one which has apparently received no consideration from investigators heretofore; but it is believed that the above example will suffice in an already, necessarily rather voluminous disclosure.

To exemplify how efficiently ammonia synthesis may be conducted by means of my invention, it may be here noted that by the use, for example, of calcium cyanamid produced at a low temperature, as above described, as the catalyst, and when operating at a temperature of even as high as 425° C., under somewhat less than one hundred atmospheres pressure, I obtain 19 volume-per cent. of $NH_3$; with the gaseous mixture of hydrogen and nitrogen in combining proportions, flowing through the catalyst at the rate of 30 liters per hour.

This yield can, of course, be materially raised by elevating the pressure, and especially if the temperature be somewhat lowered while so doing.

In general, I may add that I prefer to raise the pressure as the temperature is lowered, since the inexpensive apparatus employed is then of course better able to withstand the higher pressure.

So far as I am aware no one has heretofore actually effected the synthesis under pressure of more than possibly a trace of ammonia, when operating at temperatures even as low as 300° C., and I believe this to be possible only when such extremely active catalysts as those above described are employed. Obviously, at the lower temperatures noted, while the equilibrium percentage of ammonia is higher than for more elevated temperatures, the reaction tends to proceed less vigorously and it is for this reason that I prefer higher pressures when operating at the low temperatures indicated. On the other hand, to obtain the best results, the catalyst should be selected which, for example, at a given comparatively low temperature, is relatively unstable at such temperature when a pressure is used which is, say, a few atmospheres below that actually employed in the synthesizing operation. In other words, it is possible to over-stabilize a given catalyst by the use of an excessive pressure for such particular catalyst, to in large measure offset the gain from the increase in pressure, principally by rendering the catalyst less sensitive or efficient.

The temperature at which a given catalyst is or can be produced, usually seems to have a bearing upon the point as to the temperature at which such catalyst is likely to begin to evince instability at a given pressure.

Finally, this brings me to a point upon which I desire to lay some emphasis. Heretofore, inventors and investigators appear to have attempted to employ catalysts produced at temperatures above those at which such catalysts are used. In most instances such catalysts are then altogether too stable to be even moderately efficient.

I prefer, on the contrary, to actually produce the catalytic material, per se, at a temperature below the synthesizing temperature, or even, in some cases materially below the temperature at which the ammonia is to be formed,—the latter cases, more especially, where very high pressures are subsequently employed during the synthesis, to stabilize such catalysts.

This procedure I believe involves a distinct departure in the art.

The present case is a division of my application Serial No. 241,758, filed June 25, 1918, and entitled: Ammonia synthesis catalyst.

Having thus described my invention, what I claim is:

1. The process of synthesizing ammonia from its elements which comprises effecting said synthesis at a temperature below 550° C. by subjecting hydrogen and nitrogen under pressure to the influence of a catalytic compound which includes an atom of carbon united to two atoms of nitrogen, said compound being one produced at a temperature less than 550° C. and having a tendency to dissociate, in part at least, when subjected to a current of nitrogen and hydrogen at the same temperature at which said synthesis is effected, but at atmospheric pressure, the pressure aforesaid to which the nitrogen and hydrogen are subjected when in contact with said catalyst being such as to overcome said tendency and stabilize said compound while yet leaving it catalytically active.

2. The process of synthesizing ammonia from nitrogen and hydrogen, which comprises effecting said synthesis at a temperature below 550° C. through the intermediacy of a carbo-nitrogenous catalyst produced at a temperature at least as low as that used in effecting said synthesis and which catalyst is unstable when subjected to hydrogen at a temperature substantially equal to the synthesizing temperature but at a pressure below that at which synthesis is effected, and stabilizing said catalyst, when in use, by pressure applied thereto through the nitrogen and hydrogen to be synthesized.

3. The process of synthesizing ammonia from nitrogen and hydrogen, which comprises effecting said synthesis at a temperature below 550° C., through the intermediacy of a carbo-nitrogenous catalyst produced at a temperature materially below that at which the synthesis is effected and which catalyst is unstable when subjected to hydrogen at a temperature substantially equal to the synthesizing temperature but at a pressure below that at which said synthesis is effected, and stabilizing said catalyst, when in use, by pressure applied thereto through the nitrogen and hydrogen to be synthesized.

4. The process of synthesizing ammonia from nitrogen and hydrogen, which comprises producing an expanded porous carbonitrogenous catalyst at a given temperature by causing the evolution of gas substantially throughout the mass of material from which said catalyst is made, and synthesizing ammonia from nitrogen and hydrogen at a temperature above said given temperature while maintaining the stability of said catalyst, during said synthesis by exerting pressure thereupon.

5. The process of synthesizing ammonia from nitrogen and hydrogen, which comprises effecting said synthesis under pressure through the intermediacy of an expanded porous catalyst which includes an atom of carbon directly united to two atoms of nitrogen, said pressure at which said synthesis is effected being sufficient to stabilize the catalyst under operating conditions which at a lower pressure would render the material of said catalyst chemically unstable.

6. The process of synthesizing ammonia from nitrogen and hydrogen, which comprises effecting said synthesis under pressure through the intermediacy of a catalyst which includes an atom of carbon directly united to two atoms of nitrogen, said pressure at which said synthesis is effected being sufficient to stabilize the catalyst under operating conditions which at a lower pressure would render the material of said catalyst chemically unstable.

7. The process of synthesizing ammonia from nitrogen and hydrogen, which comprises effecting said synthesis under pressure through the intermediacy of a catalyst which includes an atom of carbon directly united to two atoms of nitrogen, said pressure at which said synthesis is effected being sufficient to stabilize the catalyst under operating conditions which at a lower pressure would cause some of the hydrogen present in the gases being treated to combine with nitrogen and with carbon present in said catalyst to form hydrocyanic acid.

8. In a process for catalytically synthesizing ammonia from its elements, the step which comprises subjecting to contact with nitrogen and hydrogen, catalytic material capable, at the temperature of the synthesizing operation and when under merely atmospheric pressure, of yielding cyanogen to form with said hydrogen, hydrocyanic acid, and while thus subjecting said material to contact with hydrogen at said temperature, maintaining said hydrogen and nitrogen under pressure sufficient to prevent said formation of hydrocyanic acid.

9. In a process for synthesizing ammonia from its elements, the steps which comprise preparing a highly porous catalytically active cyanamid compound which is unstable under the conditions of the ammonia synthesizing operation when atmospheric pressure is employed, and preserving said compound from dissociation during said operation, by exerting pressure thereupon.

10. In a process for synthesizing ammonia from its elements, the steps which comprise preparing a catalytically active cyanamid compound which is unstable under the conditions of the ammonia synthesizing operation when atmospheric pressure is employed, and preserving said compound from dissociation during said operation, by exerting pressure thereupon.

11. In a process for synthesizing ammonia from its elements, the steps which comprise preparing a catalytically active cyanamid compound the base of which is an alkaline earth metal and which compound is unstable under the conditions of the ammonia synthesizing operation when atmospheric pressure is employed, and preserving said compound from dissociation during said operation, by exerting pressure thereupon.

12. In a process for synthesizing ammonia from its elements, the steps which comprise preparing a catalytically active carbo-nitrogenous compound which includes an alkaline earth metal and which compound is normally unstable under the conditions of the ammonia synthesizing operation, subjecting said compound while subject to the influence of a stabilizing agency to contact with nitrogen and hydrogen at a temperature at which ammonia can form and at which, also, hydrocyanic acid would be produced if the operation were conducted under atmospheric pressure, by combination of a part of said hydrogen with some of the carbon and nitrogen of said compound, and preventing said formation of hydrocyanic acid while coincidently favoring the production of ammonia through the intermediacy of said stabilizing agency.

13. In a process for synthesizing ammonia from its elements, the steps which comprise preparing a catalytically active carbo-nitrogenous compound which includes an alkaline earth metal and which compound is normally unstable under the conditions of the ammonia synthesizing operation, subjecting said compound to contact with nitrogen and hydrogen under pressure greater than atmospheric and at a temperature at which ammonia can form and at which, also, hydrocyanic acid would be produced if the operation were conducted under atmospheric pressure, by combination of a part of said hydrogen with some of the carbon and nitrogen of said compound, and preventing said formation of hydrocyanic acid while coincidentally favoring the production of ammonia by said application of pressure.

In testimony whereof I have affixed my signature, in the presence of two witnesses.

JOHN COLLINS CLANCY.

Witnesses:
CHARLES F. VAUG
ELSA VORWERK.